United States Patent
Derginer et al.

(10) Patent No.: US 11,904,996 B2
(45) Date of Patent: **\*Feb. 20, 2024**

(54) METHODS AND SYSTEMS FOR CONTROLLING PROPULSION OF A MARINE VESSEL TO ENHANCE PROXIMITY SENSING IN A MARINE ENVIRONMENT

(71) Applicant: Brunswick Corporation, Mettawa, IL (US)

(72) Inventors: Matthew Eric Derginer, Butte des Mort, WI (US); Aaron J. Ward, Oshkosh, WI (US); Travis C. Malouf, Oconomowoc, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,681

(22) Filed: Nov. 10, 2021

(65) Prior Publication Data

US 2022/0063787 A1 Mar. 3, 2022

Related U.S. Application Data

(63) Continuation of application No. 16/178,255, filed on Nov. 1, 2018, now Pat. No. 11,198,494.

(51) Int. Cl.
*B63H 21/21* (2006.01)
*B63H 20/12* (2006.01)
(Continued)

(52) U.S. Cl.
CPC ............. *B63H 21/21* (2013.01); *B63H 20/12* (2013.01); *G05D 1/0875* (2013.01); *B63H 2020/003* (2013.01); *B63H 2021/216* (2013.01)

(58) Field of Classification Search
CPC .. B63H 21/21; B63H 20/12; B63H 2020/003; B63H 2021/216; G05D 1/0875
(Continued)

(56) References Cited

U.S. PATENT DOCUMENTS 3,688,252 A    8/1972    Thompson
3,715,571 A    2/1973    Braddon
(Continued)

FOREIGN PATENT DOCUMENTS

CA    2279165 A1    1/2001
CA    2282064 A1    1/2001
(Continued)

OTHER PUBLICATIONS

Poorman et al., "Multilayer Control System and Method for Controlling Movement of a Marine Vessel", Unpublished U.S. Appl. No. 11/965,583, filed Dec. 27, 2007.
(Continued)

*Primary Examiner* — Mahmoud S Ismail
(74) *Attorney, Agent, or Firm* — Andrus Intellectual Property Law, LLP

(57) ABSTRACT

A method for controlling propulsion of a marine vessel powered by a marine propulsion system including a plurality of propulsion devices includes operating at least one proximity sensor to determine a relative position of the marine vessel with respect to an object, the at least one proximity sensor having a field of view (FOV), identifying a trigger condition for expanding the FOV of the at least one proximity sensor, and determining whether the object will be sufficiently captured based on recent vessel angle data of the marine vessel. Upon determining that the object will not be sufficiently captured, thrust and/or steering position of at least one of the plurality of propulsion devices is controlled to expand the FOV of the at least one proximity sensor by
(Continued)

inducing a roll movement or a pitch movement of the marine vessel.

20 Claims, 8 Drawing Sheets

(51) Int. Cl.
  *G05D 1/00* (2006.01)
  *B63H 20/00* (2006.01)
(58) Field of Classification Search
  USPC .......................................................... 701/21
  See application file for complete search history.

(56) References Cited

U.S. PATENT DOCUMENTS

| | | | |
|---|---|---|---|
| 3,771,483 A | 11/1973 | Spencer | |
| 4,253,149 A | 2/1981 | Cunningham et al. | |
| 4,290,043 A * | 9/1981 | Kaplan | G08G 3/02 |
| | | | 340/984 |
| 4,428,052 A | 1/1984 | Robinson et al. | |
| 4,513,378 A | 4/1985 | Antkowiak | |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,515,287 A | 5/1996 | Hakoyama et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,100 B1 | 5/2001 | Fadeley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,678,589 B2 | 1/2004 | Robertson et al. | |
| 6,705,907 B1 | 3/2004 | Hedlund | |
| 6,995,527 B2 | 2/2006 | DePasqua | |
| 7,268,703 B1 | 9/2007 | Kabel et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,577,526 B2 | 8/2009 | Kim et al. | |
| 7,727,036 B1 | 6/2010 | Poorman et al. | |
| 7,813,844 B2 | 10/2010 | Gensler et al. | |
| 7,876,430 B2 | 1/2011 | Montgomery | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,265,812 B2 | 9/2012 | Pease | |
| 8,417,399 B2 | 4/2013 | Arbuckle et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,797,141 B2 | 8/2014 | Best et al. | |
| 8,831,868 B2 | 9/2014 | Grace et al. | |
| 9,039,468 B1 | 5/2015 | Arbuckle et al. | |
| 9,039,469 B1 | 5/2015 | Calamia et al. | |
| 9,132,900 B2 | 9/2015 | Salmon et al. | |
| 9,162,743 B1 | 10/2015 | Grace et al. | |
| 9,176,215 B2 | 11/2015 | Nikitin et al. | |
| 9,183,711 B2 | 11/2015 | Fiorini et al. | |
| 9,195,234 B2 | 11/2015 | Stephens | |
| 9,248,898 B1 | 2/2016 | Kirchhoff | |
| 9,355,463 B1 | 5/2016 | Arambel et al. | |
| 9,359,057 B1 | 6/2016 | Andrasko et al. | |
| 9,377,780 B1 | 6/2016 | Arbuckle et al. | |
| 9,615,006 B2 | 4/2017 | Terre et al. | |
| 9,650,119 B2 | 5/2017 | Morikami et al. | |
| 9,694,885 B2 | 7/2017 | Combee | |
| 9,729,802 B2 | 8/2017 | Frank et al. | |
| 9,733,645 B1 | 8/2017 | Andrasko et al. | |
| 9,734,583 B2 | 8/2017 | Walker et al. | |
| 9,996,083 B2 | 1/2018 | Vojak | |
| 9,904,293 B1 | 2/2018 | Heap et al. | |
| 9,908,605 B2 | 3/2018 | Hayashi et al. | |
| 9,927,520 B1 | 3/2018 | Ward et al. | |
| 9,988,134 B1 | 6/2018 | Gable et al. | |
| 10,037,701 B2 | 7/2018 | Harnett | |
| 10,048,690 B1 | 8/2018 | Hilbert et al. | |
| 10,055,648 B1 | 8/2018 | Grigsby et al. | |
| 10,106,238 B2 | 10/2018 | Sidki et al. | |
| 10,191,153 B2 | 1/2019 | Gatland | |
| 10,191,490 B2 | 1/2019 | Akuzawa et al. | |
| 10,431,099 B2 | 1/2019 | Stewart et al. | |
| 10,272,977 B2 | 4/2019 | Hashizume et al. | |
| 10,281,917 B2 | 5/2019 | Tyers | |
| 10,338,800 B2 | 7/2019 | Rivers et al. | |
| 10,429,845 B2 | 10/2019 | Arbuckle et al. | |
| 10,444,349 B2 | 10/2019 | Gatland | |
| 10,507,899 B2 | 12/2019 | Imamura et al. | |
| 10,688,841 B1 * | 6/2020 | Chen | B60G 17/0165 |
| 10,746,552 B2 | 8/2020 | Hashizume et al. | |
| 2003/0137445 A1 | 7/2003 | Van Rees et al. | |
| 2004/0221787 A1 | 11/2004 | McKenney et al. | |
| 2005/0075016 A1 | 4/2005 | Bertetti et al. | |
| 2005/0170713 A1 | 8/2005 | Okuyama | |
| 2006/0058929 A1 | 3/2006 | Fossen et al. | |
| 2006/0089794 A1 | 4/2006 | DesPasqua | |
| 2007/0032923 A1 | 2/2007 | Mossman et al. | |
| 2007/0089660 A1 | 4/2007 | Bradley et al. | |
| 2007/0178779 A1 | 8/2007 | Takada et al. | |
| 2007/0203623 A1 | 8/2007 | Saunders et al. | |
| 2008/0291052 A1 * | 11/2008 | Burns | G08G 1/164 |
| | | | 340/988 |
| 2009/0037040 A1 | 2/2009 | Salmon et al. | |
| 2009/0132101 A1 * | 5/2009 | Gizara | B63J 99/00 |
| | | | 701/2 |
| 2010/0076683 A1 | 3/2010 | Chou | |
| 2011/0153125 A1 | 6/2011 | Arbuckle et al. | |
| 2011/0172858 A1 | 7/2011 | Gustin et al. | |
| 2012/0072059 A1 | 3/2012 | Glaeser | |
| 2012/0135649 A1 * | 5/2012 | Morvillo | B63H 25/42 |
| | | | 440/63 |
| 2012/0248259 A1 | 10/2012 | Page et al. | |
| 2013/0297104 A1 | 11/2013 | Tyers et al. | |
| 2014/0316657 A1 | 10/2014 | Johnson et al. | |
| 2015/0009325 A1 | 1/2015 | Kardashov | |
| 2015/0032305 A1 | 1/2015 | Lindeborg | |
| 2015/0089427 A1 | 3/2015 | Akuzawa | |
| 2015/0134146 A1 | 5/2015 | Pack et al. | |
| 2015/0172545 A1 | 6/2015 | Szabo et al. | |
| 2015/0276923 A1 | 10/2015 | Song et al. | |
| 2015/0288891 A1 | 10/2015 | Johansson et al. | |
| 2015/0294660 A1 | 10/2015 | Stokes et al. | |
| 2015/0346722 A1 | 12/2015 | Herz et al. | |
| 2015/0375837 A1 | 12/2015 | Johnson et al. | |
| 2015/0377405 A1 * | 12/2015 | Down | B64C 17/06 |
| | | | 244/76 R |
| 2015/0378361 A1 | 12/2015 | Walker et al. | |
| 2016/0041039 A1 | 2/2016 | Olsson | |
| 2016/0069681 A1 | 3/2016 | Johnson et al. | |
| 2016/0125739 A1 | 5/2016 | Stewart et al. | |

(56) References Cited

U.S. PATENT DOCUMENTS

| | | |
|---|---|---|
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0334794 A1 | 7/2016 | Johnson et al. |
| 2016/0288884 A1* | 10/2016 | Edmunds .............. B63B 39/005 |
| 2016/0370187 A1 | 12/2016 | Gatland et al. |
| 2017/0052029 A1 | 2/2017 | Ninomiya et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1 | 6/2017 | Johsnon et al. |
| 2017/0184414 A1 | 6/2017 | Johsnon et al. |
| 2017/0205829 A1 | 7/2017 | Tyers |
| 2017/0227639 A1 | 8/2017 | Stokes et al. |
| 2017/0243360 A1 | 8/2017 | Schulte |
| 2017/0253314 A1 | 9/2017 | Ward |
| 2017/0255201 A1 | 9/2017 | Arbuckle et al. |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2018/0023954 A1 | 1/2018 | Rivers |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 | 3/2019 | Shain et al. |
| 2019/0137618 A1 | 5/2019 | Hawker |
| 2019/0187711 A1* | 6/2019 | Xie .......................... G01S 17/10 |
| 2019/0251356 A1* | 8/2019 | Rivers .................... G06V 20/20 |
| 2019/0258258 A1 | 8/2019 | Tyers |
| 2019/0283855 A1 | 9/2019 | Nilsson |
| 2019/0299983 A1 | 10/2019 | Shalev-Shwartz et al. |
| 2020/0140052 A1 | 5/2020 | Derginer et al. |

FOREIGN PATENT DOCUMENTS

| | | |
|---|---|---|
| DE | 906907 C | 3/1954 |
| DE | 112013004908 T5 | 6/2015 |
| EP | 0423901 A1 | 4/1991 |
| EP | 1775212 A2 | 4/2007 |
| EP | 1873052 A2 | 1/2008 |
| EP | 3182155 A1 | 6/2017 |
| GB | 1173442 A | 12/1969 |
| GB | 2180374 A | 3/1987 |
| JP | S58061097 A | 4/1983 |
| JP | H04101206 A | 2/1992 |
| JP | H07223591 A | 8/1995 |
| JP | 2926533 B2 | 7/1997 |
| JP | 7-246998 A | 10/1999 |
| JP | 2007248336 A | 9/2007 |
| JP | 2009227035 A | 10/2009 |
| JP | 5042906 B2 | 7/2012 |
| JP | 5226355 B2 | 7/2013 |
| JP | 2016049903 A | 4/2016 |
| JP | 2017178242 A | 10/2017 |
| KR | 20140011245 A | 1/2014 |
| WO | WO 1992005505 A1 | 4/1992 |
| WO | WO 9305406 A1 | 3/1993 |
| WO | WO 2006040785 A1 | 4/2006 |
| WO | WO 2006058400 A1 | 6/2006 |
| WO | WO 2006062416 A1 | 6/2006 |
| WO | WO 2008066422 A1 | 6/2008 |
| WO | WO 2008111249 A1 | 8/2008 |
| WO | WO 2012010818 A1 | 1/2012 |
| WO | WO 2017095235 A1 | 6/2017 |
| WO | 2017168234 | 10/2017 |
| WO | WO 2017167905 A1 | 10/2017 |
| WO | WO 2017168234 A1 | 10/2017 |
| WO | 2017205829 | 11/2017 |
| WO | WO 2018162933 A1 | 9/2018 |
| WO | WO 2018183777 A1 | 10/2018 |
| WO | WO 2018201097 A2 | 11/2018 |
| WO | 2018232377 | 12/2018 |
| WO | WO 2018232376 A1 | 12/2018 |
| WO | WO 2018232377 A1 | 12/2018 |
| WO | WO 2019011451 A1 | 1/2019 |
| WO | WO 2019096401 A1 | 5/2019 |
| WO | WO 2019126755 A1 | 6/2019 |
| WO | WO 2019157400 A1 | 8/2019 |
| WO | WO 2019201945 A1 | 10/2019 |

OTHER PUBLICATIONS

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Arbuckle et al., "System and Method for Controlling a Position of a Marine Vessel Near an Object," Unpublished U.S. Appl. No. 15/818,233, filed Nov. 20, 2017.

Arbuckle et al., "System and Method for Controlling a Position of a Marine Vessel Near an Object," Unpublished U.S. Appl. No. 15/818,226, filed Nov. 20, 2017.

Ward et al., "Methods for Controlling Movement of a Marine Vessel Near an Object," Unpublished U.S. Appl. No. 15/986,395, filed May 22, 2018.

Translation of rejection dated Mar. 3, 2020 in counterpart Japan Patent Application 2019-190603.

Search Report dated Apr. 22, 2020 in counterpart European Patent Application 19205213.2.

John Bayless, Adaptive Control of Joystick Steering in Recreational Boats, Marquette University, Aug. 2017, https://epublications.marquette.edu/cgi/viewcontent.cgi?article=1439&context=theses_open.

W. Xu et al., "Internet of Vehicles in Big Data Era." in IEEE/CAA Journal of Automatica Sinica, vol. 5, No. 1, pp. 19-35, Jan. 2018, doi:10.1109/JAS.2017.7510736. (Year 2018).

An Autonomous Solar-Powered Marine Robitic Ibservatory for Permanent Monitoring of Large Areas of Shallow Water by I. Gonzalez-Reolid et al.; Sensors 2018, 18(10), 3497; https://doi.org/10.3390/s18103497 (Year 2018).

S. Reed and V.E. Schmidt, "Providing Nautical Chart Awareness to Autonomous Surface Vessel operations," Oceans 2016 MTS/IEEE Monterery, 2016, pp. 1-8, doi: 10.1109/OCEANS.2016.7761472 (Year 2016).

* cited by examiner

METHODS AND SYSTEMS FOR CONTROLLING PROPULSION OF A MARINE VESSEL TO ENHANCE PROXIMITY SENSING IN A MARINE ENVIRONMENT

CROSS-REFERENCE TO RELATED APPLICATION

This application is a continuation of U.S. patent application Ser. No. 16/178,255, filed Nov. 1, 2018, which is incorporated herein by reference in its entirety.

FIELD

The present disclosure generally relates to systems and methods for controlling propulsion of a marine vessel in a body of water, and more specifically to propulsion control systems involving proximity sensing.

BACKGROUND

The following U.S. patents and applications provide background information and are each incorporated herein by reference in their entireties.

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

Unpublished U.S. application Ser. No. 15/818,233 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

Unpublished U.S. application Ser. No. 15/986,395 discloses a system controls movement of a marine vessel near an object. The system includes a control module in signal communication with a marine propulsion system, a manually operable input device providing a signal representing a requested translation of the marine vessel, and a sensor providing a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a propulsion control system for a marine vessel includes a plurality of propulsion devices steerable to propel the marine vessel, at least one proximity sensor that determines a relative position of the marine vessel with respect to an object, wherein the at least one proximity sensor has a field of view (FOV). A controller is configured to identify a trigger condition for expanding the FOV of the at least one proximity sensor and control thrust and/or steering position of at least one of the plurality of propulsion devices to expand the FOV of the at least one proximity sensor by inducing a roll movement or a pitch movement of the marine vessel.

One embodiment of a method for controlling propulsion of a marine vessel powered by a marine propulsion system having a plurality of propulsion devices controllable to propel the marine vessel with respect to first, second, and third perpendicular axes defining 6 degrees of freedom includes operating at least one proximity sensor to determine a relative position of the marine vessel with respect to an object, wherein the proximity sensor has a field of view (FOV). The method further includes identifying a trigger condition for expanding the FOV of the at least one proximity sensor, and then controlling thrust and/or steering position of at least one of the plurality of propulsion devices to expand the FOV of the at least one proximity sensor by inducing a roll movement or a pitch movement of the marine vessel.

Various other features, objects, and advantages of the invention will be made apparent from the following description taken together with the drawings.

BRIEF DESCRIPTION OF THE DRAWINGS

Examples of systems and methods for controlling movement of a marine vessel are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

Figure 1:
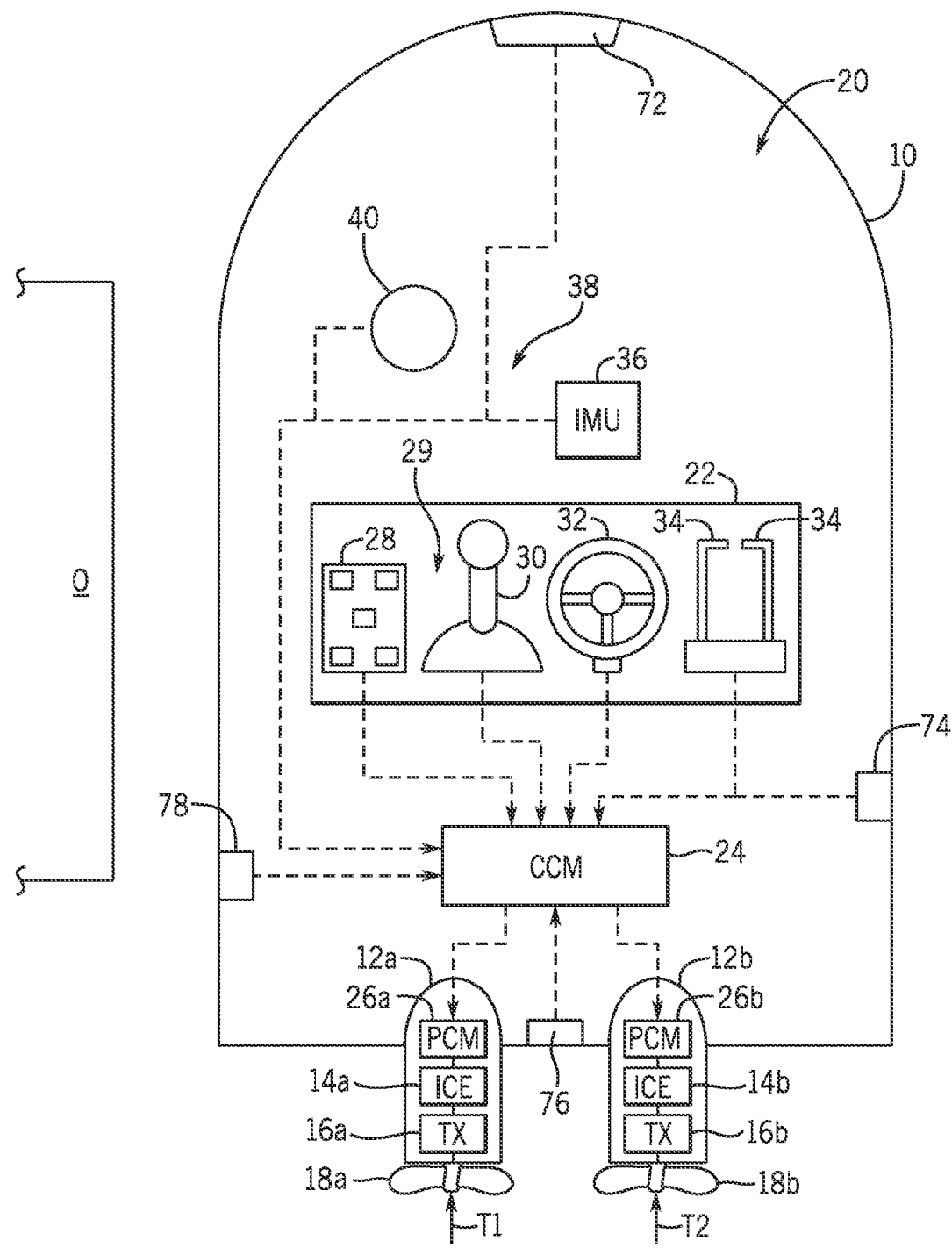
FIG. 1 is a schematic representation of a marine propulsion system on a marine vessel.

FIG. 1 shows a marine vessel 10 equipped with a propulsion system 20 configured according to one embodiment of the disclosure. The marine vessel 10 is capable of operating, for example, in a joysticking mode, among other modes, as described hereinbelow. The vessel 10 has first and second propulsion devices 12a, 12b that produce first and second thrusts T1, T2 to propel the vessel 10, as will be more fully described hereinbelow. As illustrated, the first and second propulsion devices 12a, 12b are outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also includes various control elements that comprise part of the marine propulsion system 20. The marine propulsion system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory 25a and a programmable processor 25b. As is conventional, the processor 25b is communicatively connected to the memory 25a comprising a computer-readable medium that includes volatile or nonvolatile memory upon which computer readable code is stored. The processor 25b can access the computer readable code and upon executing the code carries out functions as described hereinbelow.

In other examples of the marine propulsion system 20, only one control module is provided for the system rather than having a CCM and separate PCMs. In other examples, one CCM is provided for each propulsion device, and/or additional control modules are provided for controlling engine speed and functions separately from steering and trim of the propulsion devices. For example, the PCMs 26a, 26b may control the engines 14a, 14b and transmissions 16a, 16b of the propulsion devices 12a, 12b, while additional thrust vector modules (TVMs) may control their orientation. In other examples of the marine propulsion system 20, the vessel control elements are connected via wireless communication rather than by a serially wired CAN bus. It should be noted that the dashed lines shown in FIG. 1 are meant to show only that the various control elements are capable of communicating with one another, and do not represent actual wiring connecting the control elements, nor do they represent the only paths of communication between the elements.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates with the first and second propulsion devices 12a, 12b by communicating with the PCMs 26a, 26b. The controller 24 also receives information from an angular position sensor (e.g., pitch and roll), such as an inertial measurement unit (IMU) 36. The IMU 36 may comprise a portion of a global positioning system (GPS) 38 which, in the example shown, also comprises a GPS receiver 40 located at a pre-selected fixed position on the vessel 10, which provides information related to the global position of the vessel 10. In one example, the IMU 36 is an inertial navigation system (INS) consists of a MEMS gyroscope, or a MEMS angular rate sensor, a MEMS accelerometer, and a magnetometer, which are used together to calculate velocity and heading of the marine vessel relative to magnetic north. In other embodiments, the motion and angular position (including pitch and roll) may be sensed by a different INS configuration or an attitude heading reference system (AHRS) that provides 3D orientation of the marine vessel 10 by integrating gyroscopic measurements, accelerometer data, and magnetometer data. Signals from the GPS receiver 40 and/or the IMU (or INS) 36 are provided to the controller 24.

The steering wheel 32 and the throttle/shift levers 34 function in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively.

Figure 2:
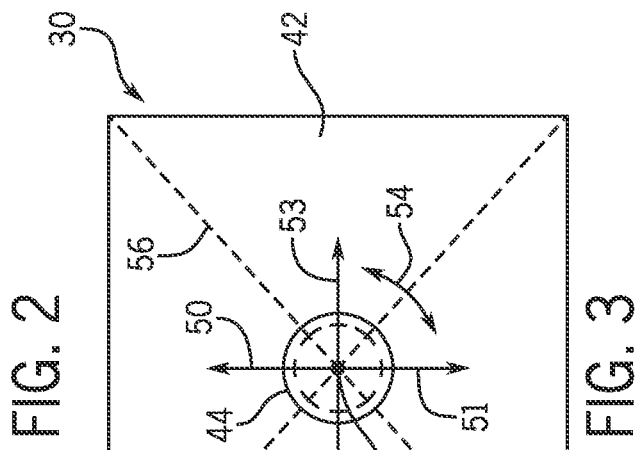
FIG. 2 is a side view of an exemplary joystick used in conjunction with the marine vessel of the present disclosure.
Figure 3:
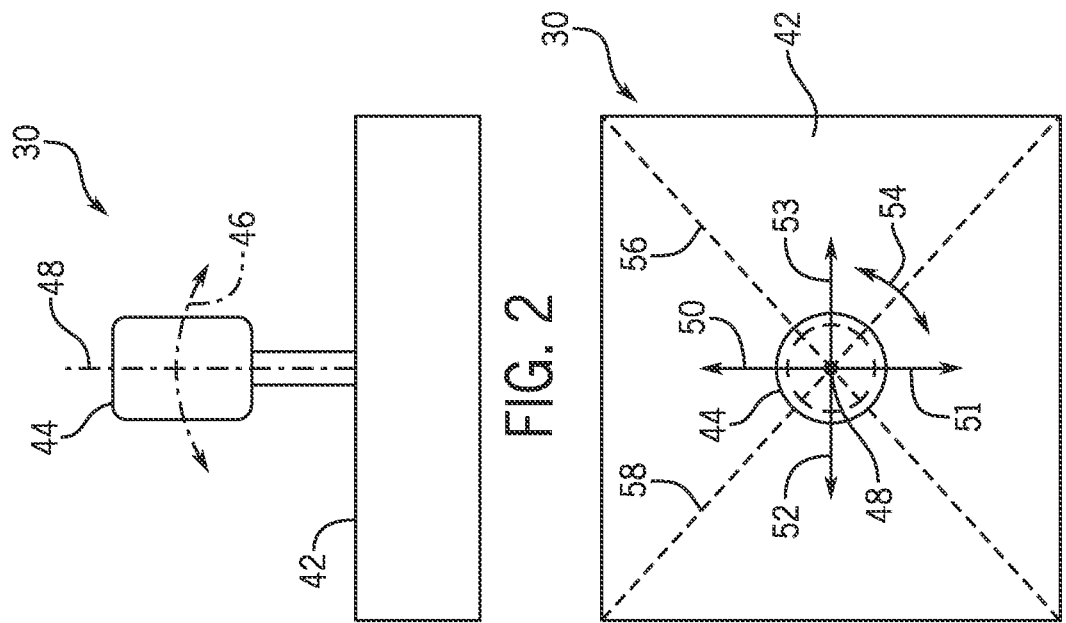
FIG. 3 is a top view of the joystick.

A manually operable input device, such as the joystick 30, can also be used to provide signals to the controller 24. The joystick 30 can be used to allow the operator of the vessel 10 to manually maneuver the vessel 10, such as to achieve translation or rotation of the vessel 10, as will be described below. It should be understood that in alternative examples, the various components 28, 30, 32, 34 may communicate directly with the PCMs 26a, 26b or may communicate with one or more central control modules. Referring to FIGS. 2 and 3, operation of the joystick 30 will now be described. FIG. 2 is a simplified schematic representation of the joystick 30 which provides a manually operable input device which can be used to provide a signal that is representative of a desired movement within three degrees of freedom, selected by an operator, of the vessel 10. The example in FIG. 2 shows a base portion 42 and a handle 44 that is movable by a user. In a typical application, the handle 44 is movable horizontally as represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIG. 2, a similar type of movement is possible in other directions that are not parallel to the plane of the drawing.

In a joysticking mode, the user may operate the joystick 30 to command the rotational and/or translational movements described hereinabove with respect to FIGS. 2 and 3. The joysticking mode may have various activation and operation requirements, and is generally configured to control low-speed propulsion operation of the marine vessel. For example, the controller 24 (e.g. CCM) may implement a maximum speed threshold requirement prior to permitting activation of the joysticking mode. For instance, the joysticking mode may be only activatable when the vessel speed is less than 15 mph, or less than 10 mph. Alternatively or additionally, activation of the joysticking mode may depend on position(s) of the throttle/shift lever 34 and/or steering wheel 32, and/or based on engine speed. In one example, the joysticking mode may only be activated when the throttle/shift lever 34 is in the neutral detent position and the engine speed is at idle. It should be understood that the joysticking mode is also intended to cover embodiments in which other types of input devices are used to provide fore/aft and lateral translation requests, for example, a keypad with fore/aft and left/right buttons.

FIG. 3 is a top view of the joystick 30. The handle 44 can move, as indicated by arrow 46 in FIG. 2, in various directions with respect to a horizontal plane generally represented by arrows 50, 51, 52 and 53. However, it should be understood that the handle 44 can move in any direction relative to its axis 48 and is not limited to the two lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Movement of the joystick is detected by one or more sensors, such as a 3-axis joystick sensor module that senses movement of the joystick with respect to the horizontal plane and rotational movement of the joystick about its vertical axis and produces a signal accordingly to indicate a position of the joystick. Note that there are many different types of joystick devices that can be used to provide a signal that is representative of a desired movement of the vessel 10, as expressed by the operator of the marine vessel through movement of the handle 44. For example, a keypad, trackball, and/or other similar input device that allows inputs in four or more directions could be used.

With continued reference to FIG. 3, it can be seen that the operator can demand a purely linear movement either toward port as represented by arrow 52 or starboard as represented by arrow 53, a purely linear movement in a forward direction as represented by arrow 50 or reverse direction as represented by arrow 51, or any combination of two of these directions. In other words, by moving the handle 44 along dashed line 56, a linear movement toward the right side and forward or toward the left side and rearward can be commanded. Similarly, a linear movement along line 58 could be commanded. It should be understood that the operator of the marine vessel can also request a combination of sideways or forward/reverse linear movement in combination with a rotation as represented by arrow 54. Any of these possibilities can be accomplished through use of the joystick 30, which communicates with the controller 24 and eventually with the PCMs 26a, 26b. The magnitude, or intensity, of movement represented by the position of the handle 44 is also provided as an output from the joystick 30. In other words, if the handle 44 is moved slightly toward one side or the other away from the neutral position (which is generally the centered and vertically upright position with respect to the base portion 42), the commanded thrust in that direction is less than if, alternatively, the handle 44 was moved by a greater magnitude away from its neutral position. Furthermore, rotation of the handle 44 about axis 48, as represented by arrow 54, provides a signal representing the intensity of desired movement. A slight rotation of the handle 44 about axis 48 would represent a command for a slight rotational thrust about a preselected point on the vessel 10. A greater magnitude rotation of the handle 44 about its axis 48 would represent a command for a higher magnitude of rotational thrust.

Further, the control module 24 may also be connected in signal communication with PCMs 26a, 26b in order to control the first and second propulsion devices 12a, 12b in an autoheading or other automatic propulsion control mode such that the vessel 10 maintains a desired heading despite the presence of wind, waves, current, or other external factors force the vessel 10 off course. Alternatively, the operator could operate the marine vessel 10 in a waypoint tracking mode, in which the vessel 10 is propelled from one waypoint (geographical coordinate) to another at a heading calculated to reach the desired waypoint. A station keeping mode that maintains a desired global position and a desired heading of the vessel 10 can also be activated via the desired movement operational section 29.

In order to maintain the desired heading of the vessel 10, the controller module 24 must have comparative information regarding the desired heading and the actual heading and/or course of the vessel. The control module 24 compares the actual heading and/or course of the vessel 10 detected by, for example, the IMU 36, with the desired heading input by the operator or calculated based on a desired heading and/or GPS position. If for example, the difference between the desired heading and the actual heading and/or course exceeds a certain threshold value, the control module 24 may position the propulsion devices 12a, 12b and/or change the thrust provided by either of the propulsion devices 12a, 12b in order to correct and thereafter maintain the heading at the desired value. For example, the control module 24 can send a signal via the CAN bus to the PCMs 26a, 26b to set angles of rotation of the first and second propulsion devices 12a, 12b with respect to the vessel 10, to set engine speed or engine thrust, and/or to set shift position based on the required movement of the vessel 10 to achieve the desired heading and GPS position.

Figure 4:
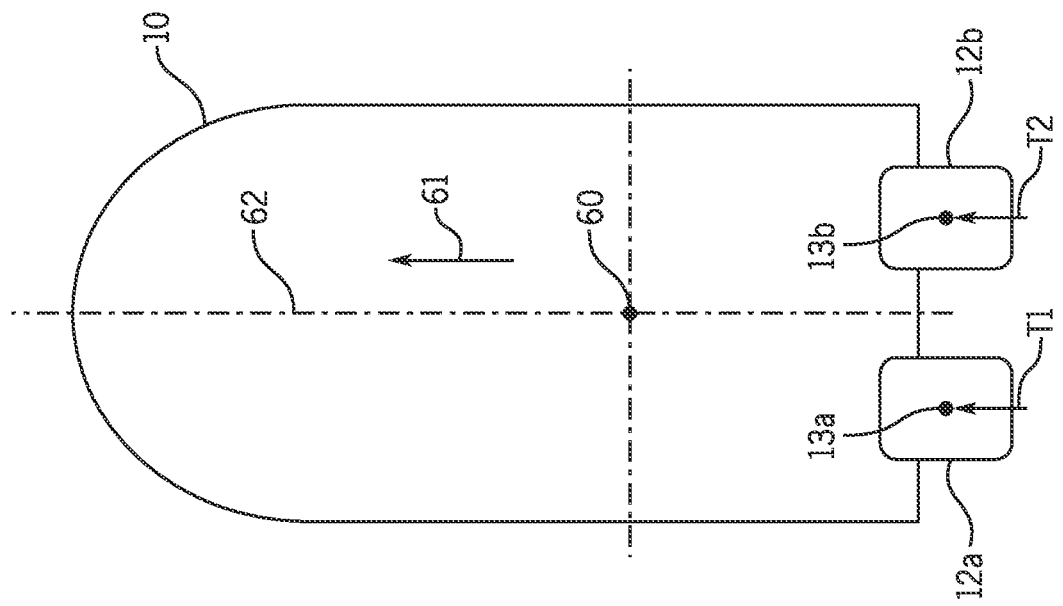
FIG. 4 illustrates an arrangement of thrust vectors during forward movement of the marine vessel.

In FIG. 4, the vessel 10 is illustrated schematically with its center of rotation (COR) 60, which can be a calibrated preselected point on the vessel 10. In other examples, point 60 could instead be an instantaneous center of gravity. The COR 60 is a function of several factors which comprise the speed of the vessel 10 as it moves through the water, the hydrodynamic forces on the hull of the vessel 10, the weight distribution of the load contained within the vessel 10, and the degree to which the vessel 10 is disposed below the waterline. The location of the COR 60 can be empirically determined for various sets of conditions. For purposes of the below explanation, the point 60 will be referred to as the COR, although it will be understood by a person of ordinary skill that similar calculations can be carried out using the center of gravity.

First and second steering axes, 13a and 13b, are illustrated for the first and second propulsion devices 12a, 12b. The first and second propulsion devices 12a, 12b are rotatable about the first and second steering axes, 13a and 13b, respectively. The ranges of rotation of the first and second propulsion devices 12a, 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the vessel 10. The rotation, gear, and thrust magnitude of one propulsion device 12a can be varied independently of the rotation, gear, and thrust magnitude of the other propulsion device 12b.

FIG. 4 illustrates a thrust orientation that is used when it is desired to move the vessel 10 in a forward direction represented by arrow 61, with no movement in either a right or left direction and no rotation about its COR 60. This is done by rotating the first and second propulsion devices 12a, 12b into an aligned position, in which their thrust vectors T1 and T2 are parallel to one another. As can be seen in FIG. 4, the first and second thrust vectors, T1 and T2, are equal in magnitude and are directed in the same forward direction. This creates no resultant rotation about the COR 60 and no resultant movement in either the left or right directions. Movement in the direction represented by arrow 61 results from all of the vector components (described further herein below) of the first and second thrust vectors T1, T2 being resolved in a direction parallel to arrow 61. The resultant thrust components parallel to arrow 61 are additive and together provide net forward thrust in the direction of arrow 61 to the vessel 10.

Figure 6:
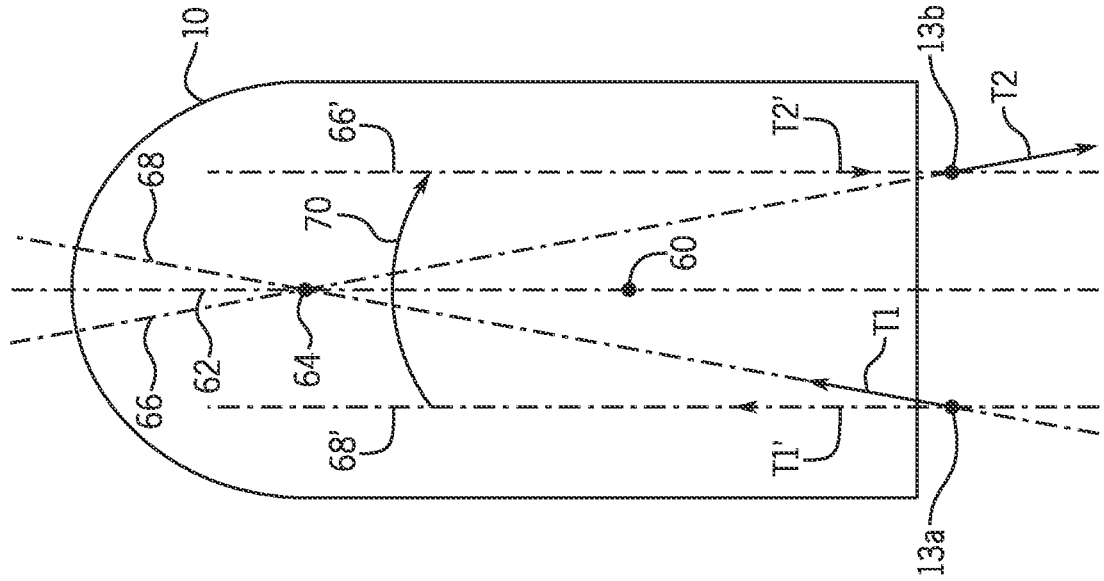
FIGS. 5 and 6 show exemplary arrangements of thrust vectors used to rotate the marine vessel about its center of rotation.
Figure 5:
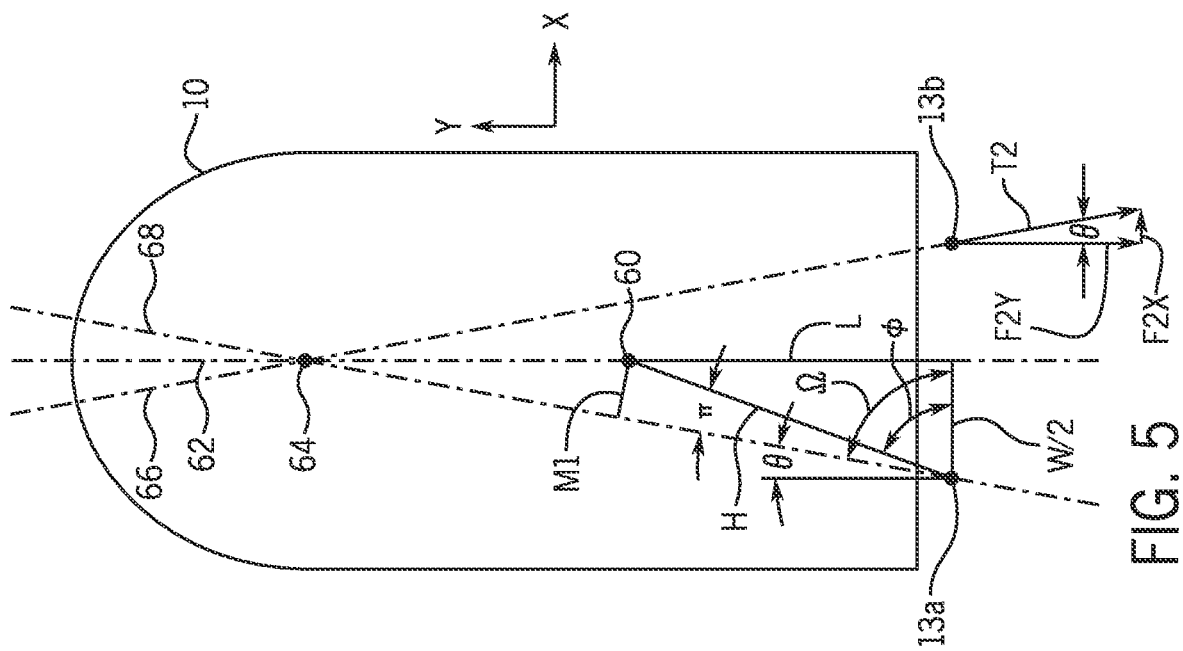

As illustrated in FIGS. 5 and 6, when a rotation of the vessel 10 is desired in combination with linear movement, the first and second propulsion devices 12a, 12b are rotated about the respective first and second steering axes 13a, 13b to steering angles θ with respect to the centerline 62 so that their thrust vectors intersect at a point on the centerline 62. Although thrust vector T1 is not shown in FIG. 5 for purposes of clarity (see FIG. 6 for its magnitude and direction), its associated line of action 68 is shown intersecting with a line of action 66 of thrust vector T2 at a point 64. Because the point 64 is not coincident with the COR 60, an effective moment arm M1 exists with respect to the thrust T1 produced by the first propulsion device 12a. The moment about the COR 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 5 comprises sides L, W/2, and the hypotenuse H. So long as the propulsion devices 12a, 12b are rotated about their respective steering axes 13a, 13b by the same angle θ, a moment arm M2 (not shown for purposes of clarity) of equal magnitude to moment arm M1 would exist with respect to the second thrust vector T2 directed along line 66.

With continued reference to FIG. 5, those skilled in the art will recognize that the length of the moment arm M1 can be determined as a function of steering angle θ; angle 1; angle 7C; the distance between the first and second steering axes 13a and 13b, which is equal to W in FIG. 5; and the perpendicular distance L between the COR 60 and a line extending between the first and second steering axes 13a, 13b. The length of the line extending between the first steering axis 13a and the COR 60 is the hypotenuse H of a right triangle and can easily be determined using the Pythagorean theorem given L and W, which are known and saved in the control module's memory. The magnitude of θ is calculated as described hereinbelow with respect to equations 1-4. The magnitude of angle Ω is 90-θ. The magnitude of angle Φ is equivalent to the arctangent of the ratio of length L to the distance between the first steering axis 13a and the vessel's centerline 62, which is identified as W/2. The length of the moment arm M1 can be mathematically determined by controller 24 using the length of line H and the magnitude of angle it (which is Ω-Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 5 shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Note that in the example of FIGS. 5 and 6, T1 has positive vector components in both the X and Y directions, while T2 has a positive vector component in the X direction and a negative vector component in the Y direction, which is therefore subtracted from the Y-directed vector component of T1. The net thrust acting on the vessel 10 can be determined by vector addition of FX and FY.

Turning to FIG. 6, a moment (represented by arrow 70) can also be imposed on the vessel 10 to cause it to rotate about its COR 60—i.e., to effectuate yaw velocity. The moment 70 can be imposed in either rotational direction: clockwise (CW) or counterclockwise (CCW). The rotating force resulting from the moment 70 can be applied either in combination with a linear force on the vessel 10 or alone. In order to combine the moment 70 with a linear force, the first and second thrust vectors T1, T2 are aligned in generally opposite directions with their respective lines of action 68, 66 intersecting at the point 64 illustrated in FIG. 6. Although the construction lines are not shown in FIG. 6, effective moment arms M1, M2 exist with respect to the first and second thrust vectors T1, T2 and the COR 60. Therefore, a moment is exerted on the vessel 10 as represented by arrow 70. If the thrust vectors T1, T2 are equal to each other in magnitude, are exerted along lines 68 and 66 respectively, and are symmetrical about the centerline 62 and in opposite directions, the net component forces parallel to the centerline 62 are equal to each other and therefore no net linear force is exerted on the vessel 10 in the forward/reverse direction. However, the first and second thrust vectors T1, T2 also resolve into forces perpendicular to the centerline 62, which in this example are additive. As a result, the marine vessel 10 in FIG. 6 will move to the right as it rotates in a clockwise direction in response to the moment 70.

If, on the other hand, it is desired that the moment 70 be the only force on the vessel 10, with no lateral movement in the forward/reverse or left/right directions, alternative first and second thrust vectors, represented by T1' and T2' in FIG. 6, are aligned parallel to each other along dashed lines 68' and 66', which are parallel to the centerline 62. The first and second thrust vectors T1', T2' are of equal magnitude and opposite direction. As a result, no net force is exerted on the vessel 10 in a forward/reverse direction. Because angle θ for both thrust vectors T1' and T2' is equal to 0 degrees, no resultant force is exerted on the vessel 10 in a direction perpendicular to the centerline 62. As a result, a rotation of the vessel 10 about its COR 60 is achieved with no linear movement in either the forward/reverse or the left/right directions.

With reference to FIGS. 2-6, it can be seen that movement of the joystick handle 44 can be used by the operator of the vessel 10 to represent virtually any type of desired movement of the vessel 10 within three degrees of freedom—i.e., surge, sway, and yaw. In response to receiving a signal from the joystick 30, an algorithm determines whether or not a rotation (shown by moment 70) about the COR 60 is requested by the operator. If forward translation with no rotation is requested, the first and second propulsion devices 12a, 12b are oriented so that their thrust vectors align in a forward parallel orientation, as shown in FIG. 4, and so long as the magnitude and direction of T1 are equal to that of T2, the vessel 10 will travel in a forward direction. If, on the other hand, the signal from the joystick 30 indicates that a rotation about the COR 60 is requested, the first and second thrust vectors T1, T2 are directed along lines 68 and 66 that do not intersect at the COR 60, but instead intersect at another point 64 along the centerline 62. As shown in FIGS. 5 and 6, this intersection point 64 can be forward from the COR 60. The thrusts T1 and T2 shown in FIG. 6 result in a clockwise rotation (shown by moment 70) of the vessel 10. Alternatively, if the first and second propulsion devices 12a, 12b are rotated so that they intersect at a point along the centerline 62 that is behind the COR 60, an opposite effect could be realized, all else being equal. It should also be recognized that, with an intersection point 64 forward of the COR 60, the directions of the first and second thrust vectors T1, T2 could be reversed to cause a rotation of the vessel 10 in a counterclockwise direction.

It should be noted that the steering angles of the propulsion devices 12a, 12b need not be the same. For example, the first propulsion device 12a can be steered to angle $\theta_1$ with respect to the centerline 62, while the second propulsion device 12b can be steered to angle $\theta_2$. When an input to the joystick 30 is made, the controller 24 will determine the net thrust and the net moment desired of the marine propulsion system 20. It can be seen, therefore, that T1, T2, O1, and O2 can thereafter be calculated by the controller 24 using the geometric relationships described hereinabove according to the following equations:

$$FX = T1(\sin(\theta_1)) + T2(\sin(\theta_2)) \quad (1)$$

$$FY = T1(\cos(\theta_1)) - T2(\cos(\theta_2)) \quad (2)$$

$$MCW = (W/2)(T1(\cos(\theta_1))) + (W/2)(T2(\cos(\theta_2))) \quad (3)$$

$$MCCW = L(T1(\sin(\theta_1))) + L(T2(\sin(\theta_2))) \quad (4)$$

$$MT = MCW - MCCW \quad (5)$$

where FX and FY are the vector components of the known target linear thrust, MT is the known total target moment (including clockwise moment MCW and counterclockwise moment MCCW) about the preselected point, and L and W/2 are also known as described above. The controller 24 then solves for the four unknowns (T1, T2, $\theta_1$, and $\theta_2$) using the four equations, thereby determining the steering angles, shift positions, and thrust magnitudes of each propulsion device 12a, 12b that will achieve the desired movement of the vessel 10. Note that equations 1-5 are particular to the thrust arrangements shown in FIGS. 5 and 6, and different vector components would contribute to clockwise or counterclockwise rotation and to forward/reverse or right/left translation given thrusts in different directions.

The above principles regarding resolution of the thrust vectors T1, T2 into X components and Y components in order to achieve lateral movement, rotational movement, or a combination of the two are the basis of a maneuvering algorithm of the present method. This maneuvering algorithm used in response to commands from the joystick 30 while in joysticking mode. It is also used to control rotational position, shift position, and thrust magnitude of the propulsion devices 12a, 12b while the vessel 10 operates in various other control modes, such as station keeping mode, auto heading mode, waypoint tracking mode, or other automatic propulsion control modes. For example, a marine vessel may have an "autodocking" mode that can be activated by a user in order to cause the propulsion control system 20 to automatically control propulsion of the marine vessel to dock the marine vessel 10 in a slip or location against a dock. In such automatic control modes, the control module 24 makes automatic corrections to each of these variables to control the vessel's heading and/or position while in these various modes in the same manner as if the operator were, in fact, manipulating the joystick to make such corrections.

Returning to FIG. 1, the vessel 10 can also be provided with one or more proximity sensors 72, 74, 76, and 78. Although one proximity sensor is shown on each of the bow, stern, and port and starboard sides of the vessel 10, fewer or more sensors could be provided at each location, and/or at other locations such as the hard top of the vessel 10. The proximity sensors 72-78 are distance and directional sensors. For example, the sensors could be radars, sonars, cameras, lasers (e.g. LIDARs), Doppler direction finders, or other devices individually capable of determining both the direction and distance, i.e. the relative position, of an object O near the vessel 10, such as a dock, seawall, slip, large rock or tree, etc. Alternatively, separate sensors could be provided for sensing direction than are provided for sensing distance, or more than one type of distance/direction sensor can be provided at a single location on the vessel 10. The sensors 72-78 provide information regarding both a direction of the object with respect to the marine vessel 10 and a shortest distance between the object O and the vessel 10. The sensors 72-78 provide this distance and direction information to the control module 24, such as by way of the CAN bus or wireless connections, as described hereinabove.

Regarding the proximity sensors, 72, 74, 76, 78, note that different types of sensors may be used depending on the distance between the vessel 10 and the object O. For example, radar sensors may be used at further distances. Once the vessel 10 comes within a particular distance of the object, LIDAR, ultrasonic, LEDDAR, or sonar sensors may instead be used. Camera sensors may be used, alone or in combination with any of the sensors mentioned above, in order to provide object proximity information to the control module 24. Note that the sensors should be placed at optimal positions on the vessel 10 in order that they are at the correct height and facing direction to detect objects the vessel 10 is likely to encounter. In a different exemplary sensor arrangement, two proximity sensors are placed on the hard top of the marine vessel 10 and arranged such that the fields of view of the two sensors, combined, cover the entire 360° area surrounding the vessel 10. Note also that the control module 24 may select one of a plurality of sensors (including radars, LIDARs, LEDDARs, sonics, and cameras) with which to sense the shortest distance and the direction of the object with respect to the vessel 10, such as based on a previously saved maps or distance measurements that was measured between the object O and the vessel 10.

In various situations, the vessel 10 may be approaching an object, such as a slip, dock, or seawall. In various control modes, such as joystick control mode or automatic propulsion control modes, the controller 24 (e.g. the CCM) may utilize information from the proximity sensors in order to control propulsion of the marine vessel, especially when controlling propulsion of a marine vessel near an object O. Accordingly, the controller may automatically determine propulsion instructions in order to avoid the object O, or to assist an operator controlling the marine vessel in avoiding the object O. For example, the propulsion control system 20 may be configured to generate an alert to a user when a user's instruction will cause collision with the object O, or the propulsion control system 20 may be configured to avoid carrying out user instructions that would cause collision with the object O. In such embodiments, the propulsion control system 20 utilizes the various proximity sensors 72-78 in order to sense the relative position of various objects surrounding the marine vessel 10 and to generate warnings and/or control instructions accordingly.

The controller may be configured to generate an environment map based on the proximity information measured by the various proximity sensors 72-78, wherein the map identifies the relative positions of objects in the marine environment surrounding the vessel 10 based on a present location of the marine vessel, such as a GPS location. As the marine vessel moves in the marine environment, the map is updated accordingly so as to accurately represent the position of objects O with respect to the marine vessel 10. For example, the map may be updated based on updated measurements from the proximity sensors 72-78, or based on geometric calculations accounting for known changes in the position of the marine vessel.

Figure 7:
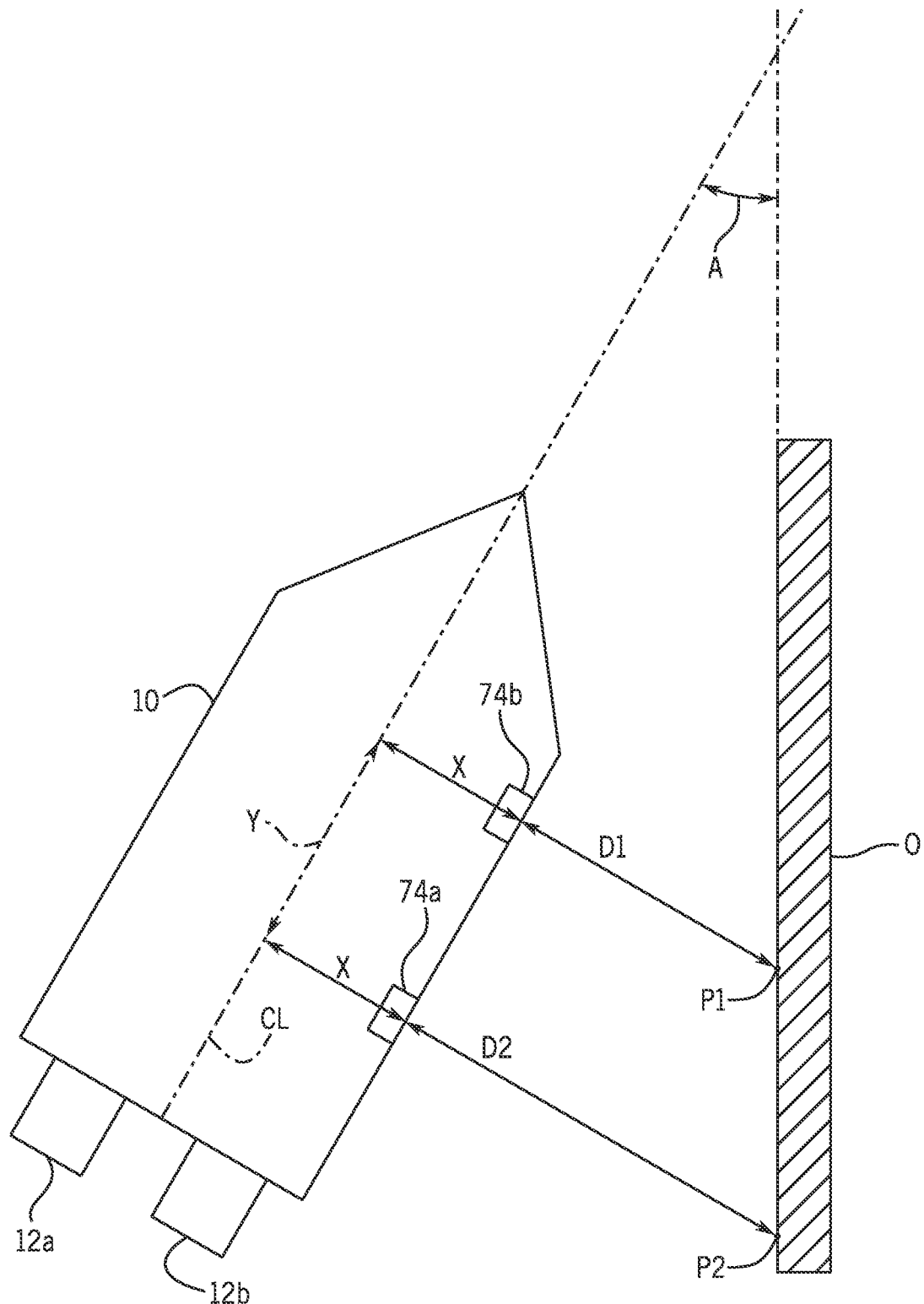
FIG. 7 illustrates an example of the marine vessel near an object.

Turning to FIG. 7, in one example, the at least one distance measuring sensor (here sensors 74a and 74b) provides to the control module 24 at least a first distance D1 between the vessel 10 and a first point P1 on the object O and a second distance D2 between the vessel 10 and a second point P2 on the object O. In other examples, many more reference points on the object's surface can be determined, depending on the type of sensor or sensors used. Note that the control module 24 can thereafter determine a total distance between a center line CL of the vessel 10 and the points P1 and P2, respectively, based on a known value of X, which is the distance between the centerline CL and each of the sensors 74a, 74b. (Here, X is the same value for each sensor 74a and 74b, but the value could be different for each sensor depending on the design of the vessel and/or the locations of the sensors.) Another known value is that of Y, which is the distance between the sensor 74a and the sensor 74b along the centerline CL of the vessel 10. Using the values D1+X and D2+X and the known value Y, in certain embodiments, the control module 24 may use known principals of trigonometry to determine an angle A between the vessel 10 and the object O. Such information may be utilized to generate the environmental map which describes the relative locations of the objects surrounding the marine vessel.

Note that a single sensor, such as 74 shown in FIG. 1, could be used in order to determine both the distances D1 and D2, such as via use of a LIDAR or other sensor. The reflected beam or other signal emitted from the sensor 74 may be split into zones in order to determine the two or more points P1, P2 (likely many points) in the environment around the vessel where multiple points on the same object are measured. A best-fit line can be drawn between the points P1, P2, etc. in order to approximate a closest edge of the object O. The angle A between the center line CL of the vessel 10 and the best fit line through the points P1, P2, etc. along the edge of the object O can also be determined, again using geometric principles. Note also that the above-described method for determining and mapping relative position of an object with respect to the vessel 10 is merely exemplary, and other methods could be used. For instance, it is possible that the sensor 74 and/or sensors 74a, 74b could measure not only the distance to a point on the object O, but also an angle of the object with respect to the sensor(s). Either way, the proximity measurement data from the various proximity sensors 72-78 must be corrected for angular position of the marine vessel 10 (i.e. roll, pitch, and yaw) in order to create an accurate and coherent environment map. If the proximity measurements are not corrected, the ranging information from the proximity sensors 72-78 will be inconsistent and have little value to mapping algorithms.

The present inventors have recognized that proximity sensors all have field of view (FOV) limitations. Thus, without the use of a prohibitively expensive number of sensors and intricate algorithms for correlating the sensed data, all information about a vessel's environment cannot be "seen" by the proximity sensors during normal operation. LIDAR, for example, has a FOV that is limited in at least the vertical direction, such as +/−30° from a central axis, and may also have a horizontally limited FOV (except in the case of a 360° LIDAR). As another example, LEDDAR has a flat, fan-shaped FOV that has a restricted vertical FOV and a restricted horizontal FOV. To provide just one example, a LEDDAR may have a horizontal FOV of 45° and a vertical FOV 7.5°. Ultrasonic sensors, by contrast, can only measure one point in an area that is usually roughly cone-shaped, and are thus also vertically and horizontally restricted in their FOV, or measurement. As another example, cameras also provide a horizontally and vertically restricted FOV, for instance, +/−170° in both the horizontal and vertical directions.

Figure 8A:
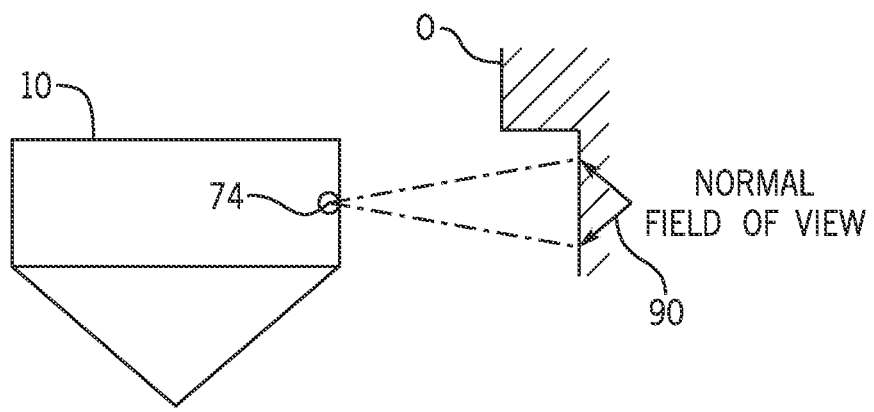
FIGS. 8A-8B schematically depict an induced roll of a marine vessel to expand the field of view of a proximity sensor.

FIG. 8A depicts an exemplary sensor 74 on the side of a marine vessel 10 providing a particular FOV 90. The FOV 90 is the normal field of view of the sensor 74, which has restrictions as described above. Through their experimentation and research, the inventors have recognized that the normal FOV 90 of many sensors 74 is often too limited for marine vessel navigation purposes. For example, with reference to FIG. 8A, the portion of the object O measured by the proximity sensor 4 does not accurately represent, or capture, the proximity of the entire object O. Namely, closer portions of the object are outside of the normal FOV 90 of the proximity sensor 74. While additional proximity sensors may be added capturing additional fields of view, the inventors have recognized that such embodiments add unnecessary expense and complexity to the system 20. The inventors have recognized that the normal FOV 90 of a given proximity sensor 74 can be expanded by deliberately inducing a rocking motion—e.g., a roll motion and/or pitch motion—of the marine vessel 10. Such as in the examples as FIGS. 8A and 8B, a roll and/or pitch motion may be induced in order to expand the FOV of a particular position sensor 72-74 in order to get a more complete view of a particular object O. For example, 1° of roll will increase a vertical FOV of the proximity sensor 74 by 1.75 meters at a distance of 100 meters.

Figure 8B:
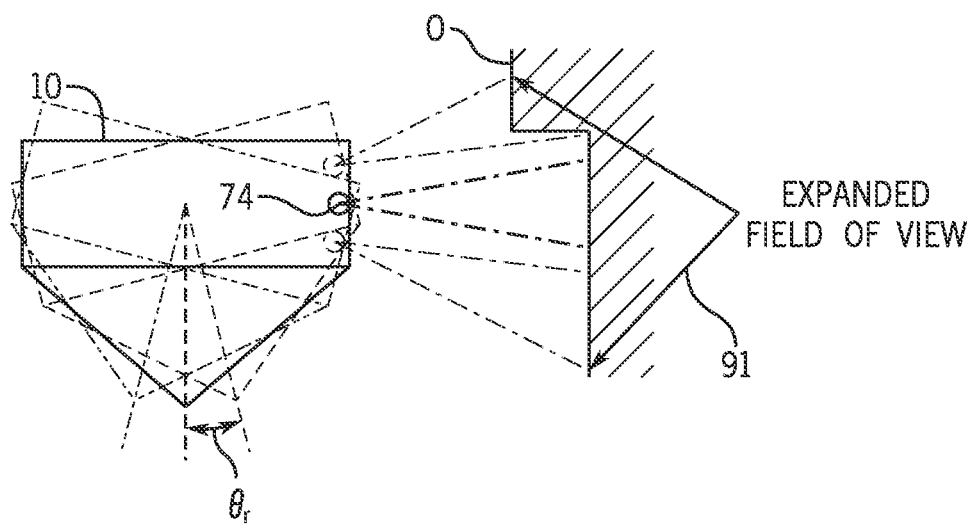

FIG. 8B illustrates an expanded FOV 91 resulting from an induced roll motion of the marine vessel 10. By purposely perturbing the attitude of the marine vessel, the angle of the sensor is changed and the FOV of the proximity sensor 74 is correspondingly expanded. In the illustrative example, a roll motion is induced in the marine vessel 10, where a roll angle $\theta_r$ is induced in both roll directions in order to provide an expanded FOV 91 by the proximity sensor 74. Measurements by the proximity sensors 74 are adjusted to account for the roll angle $\theta_r$ as is described above. Accordingly, a larger area of the environment around the marine vessel can be mapped using measurements by the proximity sensor 74.

Appropriate thrust and steering commands can be calculated according to the methods described herein to provide the expanded FOV 91 necessary for adequate mapping of the marine environment and dependent on the situational needs of a particular marine environment. For example, roll and/or pitch may be induced in order to expand the FOV of a particular position sensor 72-74 by a threshold amount in order to get a more complete view of a particular object O. In certain embodiments, the controller may induce a rocking motion—e.g. a roll motion and/or a pitch motion—by adjusting the thrust and/or steering position of the marine vessel in such a way that little or no vessel translation occurs. For example, the propulsion devices may be maneuvered in a way that targets the natural frequencies of the marine vessel in order to gradually induce an increasing roll motion or pitch motion.

Figure 9:
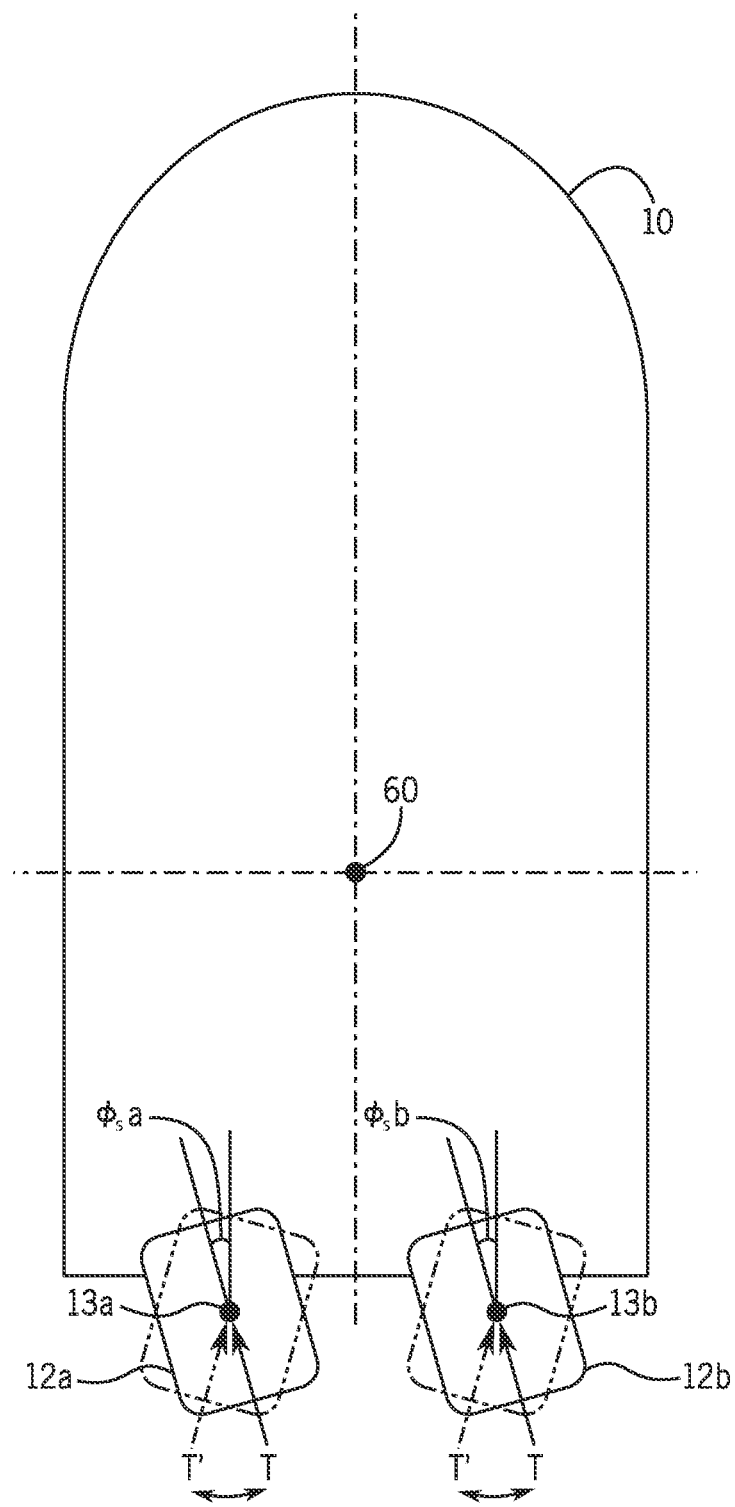
FIG. 9 schematically illustrates exemplary thrust and steering position control of propulsion devices in order to induce a roll movement.

The propulsion devices 12a, 12b are also controlled in order to selectively produce a thrust T. For example, the engines of the propulsion devices may be controlled in order to produce a pulsed thrust T. To induce a pitch motion, the propulsion devices 12a, 12b may be controlled to pulse the thrust at a predetermined interval and magnitude so as to induce a pitch movement of the marine vessel 10 without causing any forward motion thereof. FIG. 9 provides an illustrative diagram of an exemplary propulsion device control that may be utilized to induce a roll motion. In the example, each propulsion device 12a, 12b is rotated about its steering axis 13a, 13b between a first steering position and a second steering position ($\phi_s$ and $-\phi_s$) at a predetermined frequency. In one example of inducing a roll motion, the propulsion devices 12a, 12b may be controlled so as to momentarily generate the thrust T when the predefined steering angle $\phi_s$a, $\phi_s$b is reached. The propulsion devices 12a, 12b may then be rotated to the opposite steering angle ($-\phi_s$a, $-\phi_s$b angles not marked in the figure, for visual clarity) and thrust T' may be momentarily generated upon reaching that steering angle. The thrust T, T' is calculated such that effectuating the pulsed trust at the alternating angles will not induce net translation or yaw velocity in the marine vessel 10—i.e., outside of any translation or yaw commanded by the user or the controller-executed navigation. For example, the steering angle $\phi_s$, the frequency of rotation, and the timing and magnitude of the thrust T may be calculated based also on the known dynamics of a particular marine vessel. For example, such calculation may be based on the natural frequency of the marine vessel, which is the frequency at which the marine vessel naturally rotates about its center of gravity or center of rotation.

In various embodiments, the propulsion devices 12a, 12b may be moved in parallel or moved oppositely. Likewise, the propulsion devices 12a, 12b may be moved to steering angles of the same magnitude as one another, or to different magnitudes, depending on the configuration of the propulsion system (such as the number of propulsion devices and placement on the marine vessel 10). Likewise, the thrust vectors T of the propulsion devices 12a, 12b may be identical to one another, or may have different magnitudes. Again, the thrust vectors T and steering angles $\phi_s$a, $\phi_s$b are calculated so as to induce a roll and/or pitch motion without causing translation of the marine vessel 10 in order to do so.

The propulsion devices 12a, 12b may be controlled to slowly induce the pitch or roll movement, which can be increased with each period of the motion by providing targeted steering and thrust control. For example, the propulsion devices 12a, 12b may be rotated at a predetermined frequency causing the roll angle to increase in each roll period until a threshold roll angle $\theta_r$ is reached. Similar controls may be provided to induce a threshold pitch. The relevant vessel angle, such as the pitch and/or roll angle of the marine vessel, can be measured for example, by the IMU 36. The threshold roll angle may be calculated to provide a pre-determined expanded FOV 91, such as based on a distance of an object O to be explored. To provide just one example, a threshold roll angle of 10° may be set in order to increase the vertical FOV by +/−17.5 meters at a 100-meter range. This provides a significant expansion in the FOV of the proximity sensor 74.

Figure 10:
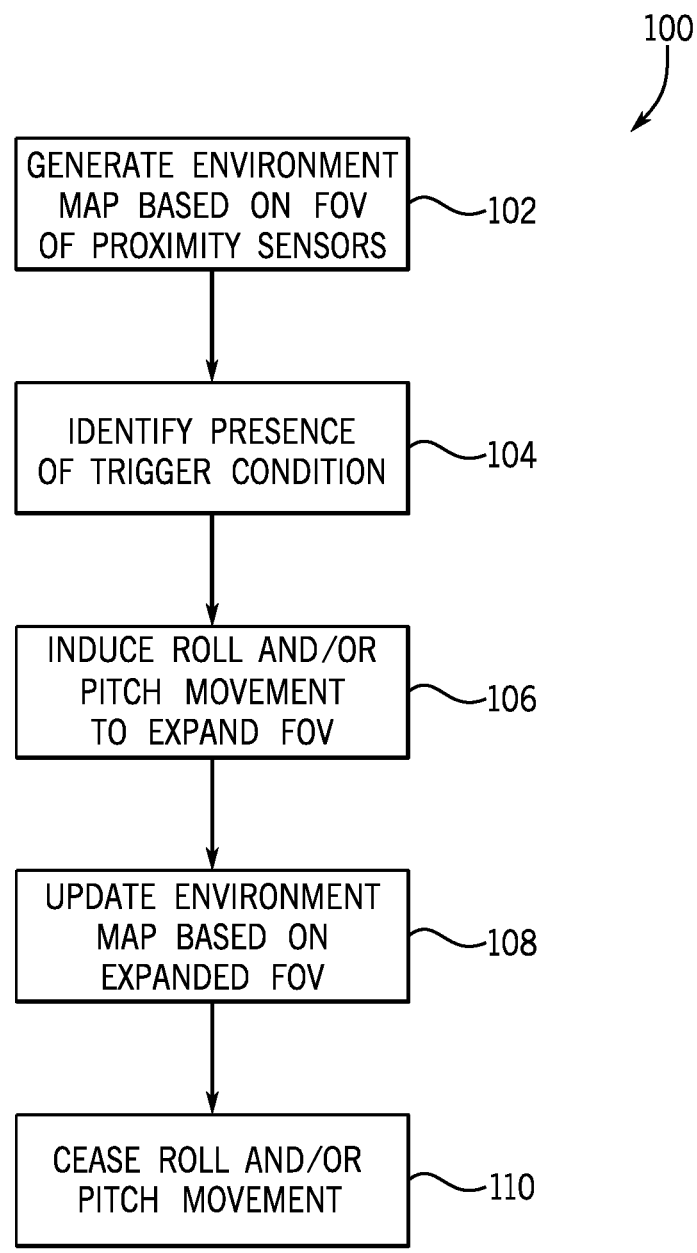
FIGS. 10-11 are flowcharts depicting exemplary methods, or portions thereof, of controlling propulsion of a marine vessel according to embodiments of the present disclosure.
Figure 11:
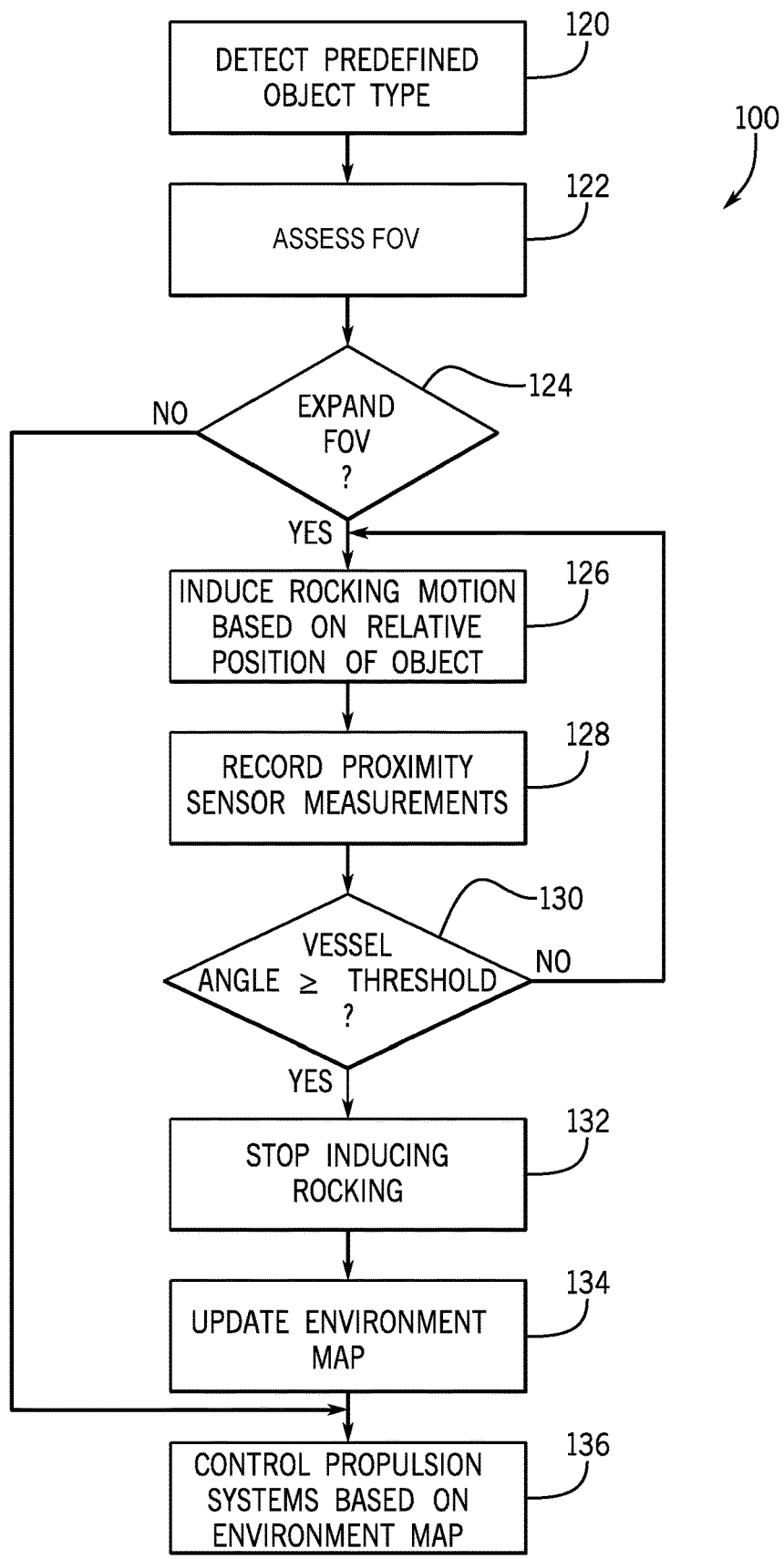

FIGS. 10-11 depict exemplary embodiments of methods 100 for controlling propulsion of a marine vessel in order to provide an expanded FOV by one or more proximity sensors. Referring to FIG. 10, an environment map is generated based on information by the various proximity sensors on the marine vessel at step 102, which is naturally limited by the FOV of those proximity sensors. At step 104 a trigger condition is identified for expanding the FOV of the at least one proximity sensor. Namely, the controller determines that certain conditions are present indicating that a propulsion control routine should be executed in order to expand the FOV of one or more sensors. The controller may be configured to detect any of various trigger conditions indicating a needed expansion in the FOV of one or more sensors, examples of which are described below. Once the trigger condition is identified, propulsion control instructions are determined and executed in order to induce roll and/or pitch movement of the marine vessel at step 106 so as to expand the FOV of the one or more proximity sensors. The proximity measurement information from the one or more proximity sensors is then utilized to update the environment map to include the information regarding the expanded FOV at step 108. Once the needed information is gathered, then the propulsion control instructions generating the roll or pitch movement are stopped so that roll and/or pitch movements cease at step 110. The updated environment map can then be utilized to provide more accurate information that can be utilized as the basis for controlling propulsion of the marine vessel in the various control modes, as is described above.

FIG. 11 provides a more detailed description of an exemplary method 100 for controlling propulsion in order to expand the sensor FOV. In the depicted example, an environment map based on the normal FOV of one or more proximity sensors is already generated. A trigger condition for expanding the FOV of at least one proximity sensor is detected, which in the depicted example is the detection of a predefined object type at step 120. For example, the predefined object type may be the detection of a dock or slip or a seawall—e.g. detection of an object meeting a predefined set of dimension and shape qualities that fall within parameters that satisfy a trigger condition. If expansion of the FOV is determined to be necessary at step 124, then the steering and thrust of the propulsion devices are controlled at step 126 in order to induce a rocking motion. For example, propulsion may be controlled in order to induce a roll movement, a pitch movement, or both, depending on the relative position of the object O about which more information is needed. Measurements from the proximity sensors are recorded at step 128 which provides information about the expanded FOV 91. In one embodiment, the controller is configured to continually assess the vessel angle at step 130 to determine whether a predefined threshold angle has been reached. For example, information from the IMU 36 may be monitored (represented at step 130) and the propulsion control continued so as to gradually increase the prescribed rocking motion until the threshold angle is reached. At that point, the propulsion control is stopped so as to stop inducing the rocking at step 132. The environment map is updated at step 134 to include the new information gathered by the one or more proximity sensors. The propulsion of the marine vessel can then be controlled based on the updated environment map at step 136, such as to execute one of the automatic propulsion control modes described above.

In other embodiments, additional steps may be executed prior to identifying or acting on a trigger condition for expanding FOV, where the controller assesses the current FOV 122 measured by the proximity sensors and represented in the existing environment map. For example, the FOV may be calculated based on information relating to the normal FOV 90 of the relevant proximity sensor, the distance of an object O or set of objects, and recent vessel angle data (such as from the IMU 36). For example, if the marine vessel 10 is operating in waves and/or wind, the pitch and roll of the marine vessel 10 may be changing in order to naturally provide a sufficient FOV. Accordingly, the controller may be configured to calculate and assess the relevant FOV, as represented at step 124, in order to determine whether a pitch and/or roll motion would provide additional information needed to sufficiently capture the object O in the environment map. If not, then the controller may skip the steps of inducing rocking and progress to step 136 where propulsion systems are controlled based on the environment map, such as in an automatic propulsion control mode.

The controller may be configured to detect any one or more of various trigger conditions. In the example at FIG. 11, a predefined object type is detected. Alternatively or additionally, the controller may be configured to identify a trigger condition upon detecting an object of a threshold size and/or an object within a threshold distance from the marine vessel 10. Similarly, the trigger condition may involve detection of an object at a predefined relative position with respect to the marine vessel 10, such as based on the current and/or instructed direction of movement of the marine vessel 10. Alternatively or additionally, a trigger condition may be based on a threshold concentration of objects within a predefined distance or radius of the marine vessel—e.g. a threshold number of objects within a defined range of relative positions (e.g. a defined angle range). The concentration determination may vary depending on the type of sensor and how many points are obtained. For example, whereas one point might be relevant (e.g., meet a threshold concentration) when an ultrasonic sensor is used, one point probably would not be relevant in the case of LIDAR. In still other examples, a trigger condition may be identified upon engagement of an automatic propulsion control mode, such as an autodocking mode.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method for controlling propulsion of a marine vessel powered by a marine propulsion system including a plurality of propulsion devices controllable to propel the marine vessel with respect to first, second, and third perpendicular axes defining six degrees of freedom, the method comprising:
   operating at least one proximity sensor to determine a relative position of the marine vessel with respect to an object, the at least one proximity sensor having a field of view (FOV);
   identifying a trigger condition for expanding the FOV of the at least one proximity sensor;
   determining whether the object will be sufficiently captured based on recent vessel angle data of the marine vessel, including at least one of a recent pitch, roll, and/or yaw angle measurement of the marine vessel; and
   upon determining that the object will not be sufficiently captured, controlling thrust and/or steering position of at least one of the plurality of propulsion devices to expand the FOV of the at least one proximity sensor by inducing a roll movement or a pitch movement of the marine vessel.

2. The method of claim 1, wherein determining whether an object will be sufficiently captured includes calculating an FOV based on the recent vessel angle data.

3. The method of claim 2, wherein determining whether an object will be sufficiently captured further includes determining a sufficient FOV to capture the object and comparing the sufficient FOV to the FOV based on the recent vessel angle data.

4. The method of claim 1, wherein the trigger condition includes detection of the object at a predefined relative position with respect to the marine vessel based on a current and/or instructed direction of movement of the marine vessel.

5. The method of claim 1, wherein the trigger condition includes detection of the object within a threshold distance of the marine vessel.

6. The method of claim 5, wherein the trigger condition includes detection of the object of a threshold size within the threshold distance of the marine vessel.

7. The method of claim 1, wherein the trigger condition includes detection of a predefined object type.

8. The method of claim 7, wherein the predefined object type is at least one of a dock or a slip.

9. The method of claim 1, wherein the trigger condition includes detection of a threshold concentration of objects within a predefined radius relative to a current position of the marine vessel.

10. The method of claim 1, further comprising:
    generating an environment map identifying relative positions of objects based on a present location of the marine vessel and the field of view of the at least one proximity sensor; and
    wherein the trigger condition includes engagement of an automatic propulsion control mode where a controller controls the plurality of propulsion devices based on the environment map.

11. A propulsion control system for a marine vessel, the propulsion control system comprising:
    a plurality of propulsion devices steerable to propel the marine vessel;
    at least one proximity sensor that determines a relative position of the marine vessel with respect to an object, the at least one proximity sensor having a field of view (FOV);
    a controller configured to:
      identify a trigger condition for expanding the FOV of the at least one proximity sensor;
      determine whether the object will be sufficiently captured based on recent vessel angle data of the marine vessel, including at least one of a recent pitch, roll, and/or yaw angle measurement of the marine vessel; and
      upon determining that the object will not be sufficiently captured, control thrust and/or steering position of at least one of the plurality of propulsion devices to expand the FOV of the at least one proximity sensor by inducing a roll movement or a pitch movement of the marine vessel.

12. The propulsion control system of claim 11, wherein determining whether an object will be sufficiently captured includes calculating an FOV based on the recent vessel angle data.

13. The propulsion control system of claim 12, wherein determining whether an object will be sufficiently captured further includes determining a sufficient FOV to capture the object and comparing the sufficient FOV to the FOV based on the recent vessel angle data.

14. The propulsion control system of claim 11, wherein the trigger condition includes detection of the object at a predefined relative position with respect to the marine vessel based on a current and/or instructed direction of movement of the marine vessel.

15. The propulsion control system of claim 11, wherein the trigger condition includes detection of the object within a threshold distance of the marine vessel.

16. The propulsion control system of claim 15, wherein the trigger condition includes detection of the object of a threshold size within the threshold distance of the marine vessel.

17. The propulsion control system of claim 11, wherein the trigger condition includes detection of the object being a predefined object type.

18. The propulsion control system of claim 17, wherein the predefined object type is at least one of a dock or a slip.

19. The propulsion control system of claim 11, wherein the trigger condition includes detection of a threshold concentration of objects within a predefined radius relative to a current position of the marine vessel.

20. The propulsion control system of claim 11, wherein the controller is further configured to generate an environment map identifying relative positions of objects based on a present location of the marine vessel and the field of view of the at least one proximity sensor; and wherein the trigger condition includes engagement of an automatic propulsion control mode where the controller controls the plurality of propulsion devices based on the environment map.

\* \* \* \* \*